United States Patent [19]
Roman

[11] Patent Number: 5,944,292
[45] Date of Patent: Aug. 31, 1999

[54] ERGONOMICAL TRACKBALL MOUNT

[75] Inventor: Edgar M. Roman, Fort Collins, Colo.

[73] Assignee: Lucent Technologies Inc., Murray Hill, N.J.

[21] Appl. No.: 09/030,244

[22] Filed: Feb. 25, 1998

[51] Int. Cl.⁶ ................................... F16M 11/00
[52] U.S. Cl. ..................... 248/200; 248/918; 248/205.2
[58] Field of Search ..................... 248/200, 205.2, 248/291.1, 118, 310, 313, 316.7, 918

[56] References Cited

U.S. PATENT DOCUMENTS

| D. 367,387 | 2/1996 | Sweere | D6/511 |
|---|---|---|---|
| 1,691,213 | 11/1928 | Smith | 248/310 |
| 4,693,443 | 9/1987 | Drain | 248/447.1 |
| 4,984,760 | 1/1991 | Cohn et al. | 248/126 |
| 5,056,743 | 10/1991 | Zwar et al. | 248/118 |
| 5,370,241 | 12/1994 | Silvers | 211/13 |
| 5,413,294 | 5/1995 | Greenquist | 248/127 |
| 5,470,040 | 11/1995 | Bhagat et al. | 248/222.4 |
| 5,529,271 | 6/1996 | Dunchock | 248/205.2 |
| 5,543,821 | 8/1996 | Marchis et al. | 345/167 |
| 5,601,270 | 2/1997 | Chen | 248/454 |
| 5,636,822 | 6/1997 | Hendershot et al. | 248/346.01 |
| 5,713,548 | 2/1998 | Boyer et al. | 248/205.2 |

Primary Examiner—Ramon O. Ramirez
Assistant Examiner—Anita M. King

[57] ABSTRACT

The trackball mounting apparatus of the present invention functions to orient the data input device in an ergonomically correct mode. The preferred embodiment of the invention is in the form of a trackball connected to the personal computer via a cable and attached to the mounting apparatus in an orientation that is parallel to the normal position of the palm of the user's hand so that the user can maintain their hand in a normal at rest position while operating the data input device. The use of this apparatus therefore reduces the strain on the user's hand and arm muscles as well as reducing the extent to which the data input device protrudes from the side of the personal computer. Furthermore, this mounting apparatus enables the user to make use of an adjunct data input device, connected to the personal computer via a cable, as a stationary pointing device.

4 Claims, 3 Drawing Sheets

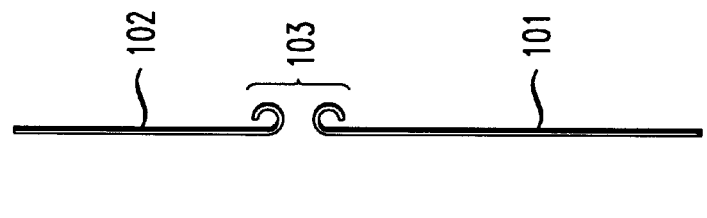
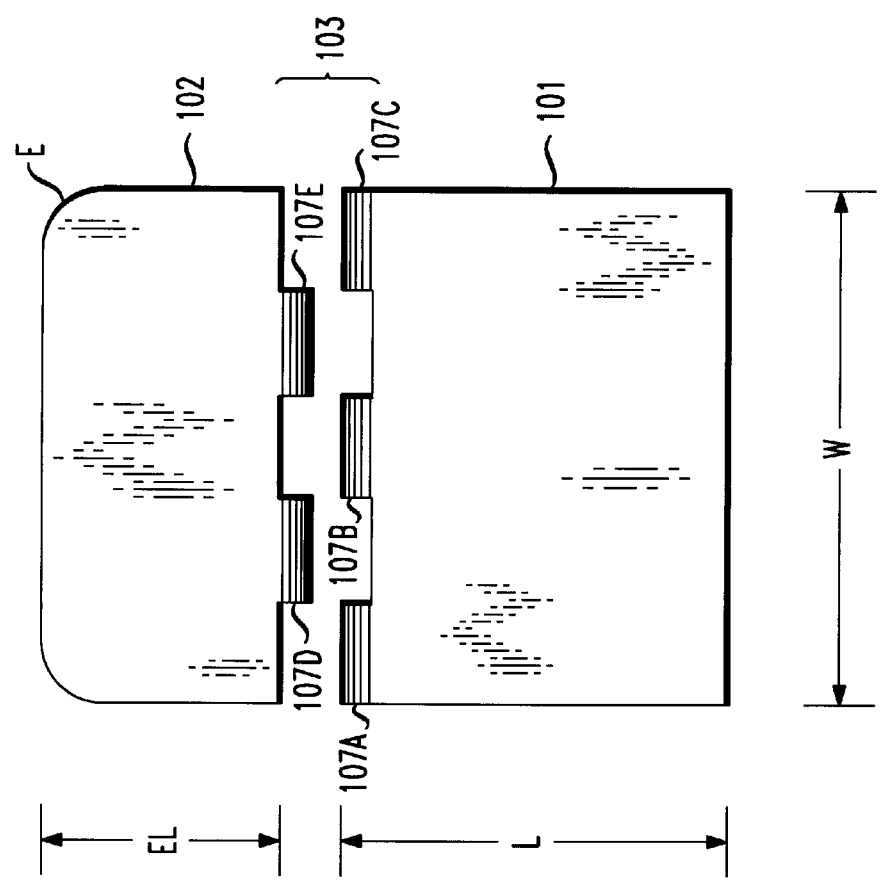

ERGONOMICAL TRACKBALL MOUNT

FIELD OF THE INVENTION

This invention relates to personal computer systems, and, in particular, to a mounting apparatus that is used to mount a stationary pointing device, such as a trackball, in an orientation that is ergonomically correct for the user for use with a personal computer system.

PROBLEM

It is a problem in the field of personal computer systems to provide a data input device that is mounted on or associated with the personal computer in a location and in an orientation that is convenient for the user. Existing personal computer systems provide data input devices either as an integral part of the personal computer in the form of a stationary pointing device, such as a trackball or pressure sensitive touch pad, or as an adjunct device, such as a mouse. The stationary pointing device is mounted in either one of two locations: mounted in the center of the keyboard coplanar with the surface thereof or mounted outboard from the keyboard projecting from the side of the personal computer and coplanar with the top surface thereof.

In the first case, the location of the stationary pointing device is fairly inconvenient for the user in that the user must reach across half of the keyboard to access the stationary pointing device. One benefit of this arrangement is that it is equally convenient for either right-handed or left-handed users. A further disadvantage of this arrangement is that the size of the stationary pointing device must be kept to a minimum so as to not occupy too much surface area of the keyboard surface. This forces the stationary pointing device to be smaller in size than that used in the outboard mounting arrangement. The small stationary pointing device also can be inconvenient for the user since it provides only a small working surface.

The outboard mounting arrangement for the stationary pointing device itself has a number of problems. The personal computer should be equipped with jacks on both sides of the keyboard to facilitate use of the stationary pointing device by both right-handed and left-handed users. In addition, in many of these personal computer systems, the user must plug the stationary pointing device into its jack in order to operate the computer system whether or not the user is interested in using the stationary pointing device. This causes unnecessary additional wear on the connectors that are used to interconnect the stationary pointing device with the personal computer. Furthermore, the stationary pointing device can easily be jarred loose from its connector during use, causing the personal computer to enter an error mode.

One example of an outboard mounted stationary pointing device is disclosed in U.S. Pat. No. 5,543,821, titled "Track Ball Mounted on Keyboard" in the form of an improved trackball that can be conveniently manipulated with one hand and rotated in two degrees of freedom. In particular, a mounting apparatus is used to clamp the trackball to the side of the keyboard, with the trackball assembly being connected to the mounting apparatus through two extending legs of a yoke. An axle connects the legs of the yoke to the mounting apparatus to enable the user to rotate the trackball in an up and down direction through a limited range of motion. In addition, the yoke has a hub around which the trackball can be rotated toward or away from the user. A set of O-rings in each of the axle-yolk and hub mechanisms are used to provide sufficient tension to impede rotation and also to maintain the trackball in the user selected position.

An example of an adjunct data input device is disclosed in U.S. Pat. No. 5,413,294, titled "Platform Positioned Above a Keyboard for Use with a Computer Mouse" in the form of a removable platform that is positioned above the numeric keys at the right side of the keyboard. The platform is attached to the keyboard by means of VELCRO® strips so that the platform can be removed from the keyboard when not in use. The platform enables the user to place the mouse on top of the keyboard to thereby minimize the distance between the mouse and the keys of the keyboard.

A problem that is shared in common with these types of data input device mounting arrangements is that the orientation of the data input device is contrary to what is ergonomically correct for the user. In particular, when a person stands with their hands by their side, the natural orientation of the human hand is palm facing inward to the hips. The traditional data input device demands the palm of the hand be rotated 90 degrees out of the natural position, causing strain across the tendons and muscles in the forearm. Traditional adjunct data input devices are laid flat on a table or work surface in close proximity to the personal computer. Because of the size of the adjunct data input devices, they are sometimes placed far away from the keyboard where more space is available. This distance can cause strain in the shoulder and neck in addition to the arm strain noted above.

Therefore, the existing data input device mounting systems are oriented in ergonomically incorrect orientation for the user's hand and cause strain on the user's hand and arm muscles if the user makes extensive use of the data input device.

SOLUTION

The above described problems are solved and a technical advance achieved in the field by the trackball mounting apparatus of the present invention that functions to orient the data input device in an ergonomically correct mode. The preferred embodiment of the invention is in the form of a trackball connected to the personal computer via a cable and attached to the mounting apparatus in an orientation that is parallel to the normal position of the palm of the user's hand so that the user can maintain their hand in a normal at rest position while operating the data input device. The use of this apparatus therefore reduces the strain on the user's hand and arm muscles as well as reducing the extent to which the data input device protrudes from the side of the personal computer. Furthermore, this mounting apparatus enables the user to make use of an adjunct data input device, connected to the personal computer via a cable, as a stationary pointing device.

BRIEF DESCRIPTION OF THE DRAWING

FIGS. 3 and 4 illustrate exploded top and side views of the trackball mounting apparatus;

DETAILED DESCRIPTION

Figure 1:
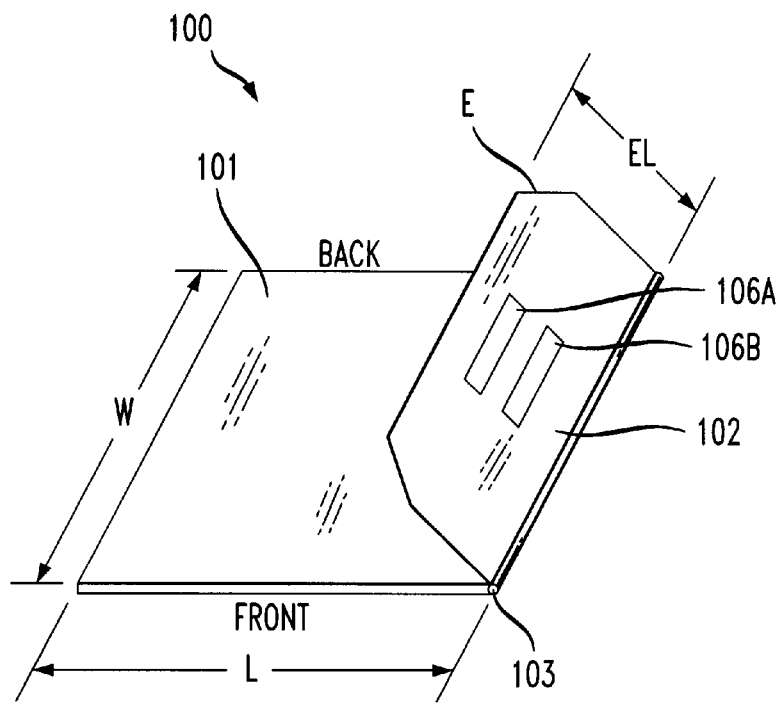
FIG. 1 illustrates a perspective view of the trackball mounting apparatus.

The trackball mounting apparatus functions to hold an adjunct data input device, such as a trackball, in a fixed position as a stationary pointing device in an orientation that is ergonomically correct for the user. In particular, as shown in perspective view in FIGS. 1, 2 and in top and side views in FIGS. 3, 4, the trackball mount 100 comprises a pair of hingeably interconnected flat plates 101, 102 that can be mounted juxtaposed to the personal computer keyboard 201. A first of this pair of plates 101, 102 comprises a base plate 101, having a front side and a back side of length L and width W, that can either be placed under the keyboard 201 of the personal computer to hold the ergonomically correct trackball mount 100 securely in place or can be attached thereto by means of an interconnection mechanism, such as VELCRO®. Attached to the base plate 101 by an hinge mechanism 103, is an extension plate 102 that comprises a flat plate of length EL and width W and having rounded corners E.

Figure 5:
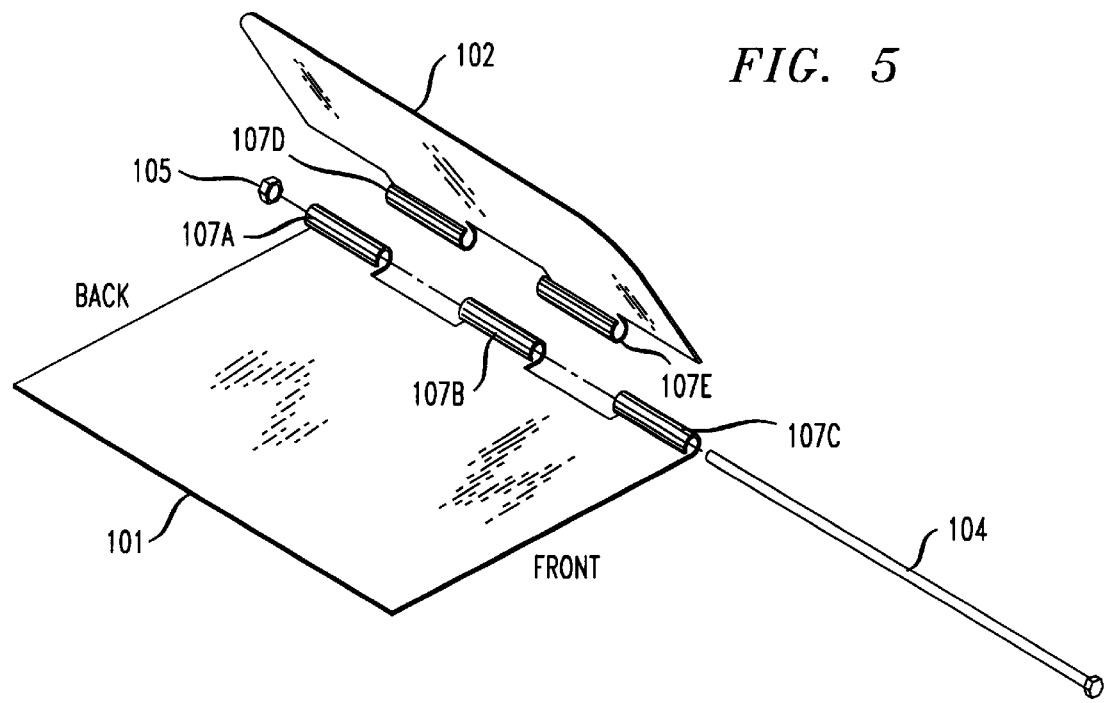
FIGS. 5 and 6 illustrate perspective exploded views of two embodiments of the trackball mounting apparatus.
Figure 6:
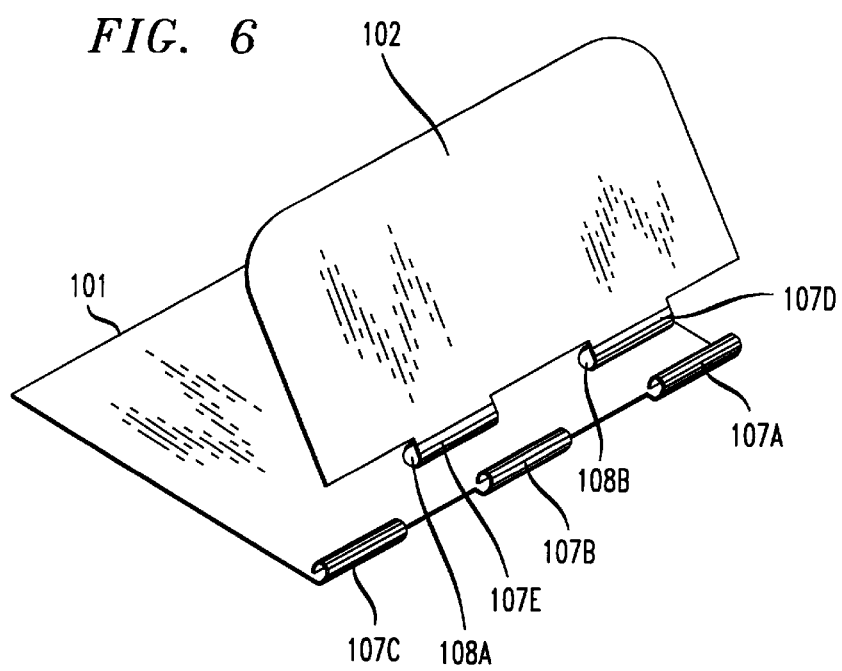

FIGS. 5 and 6 illustrate perspective exploded views of two embodiments of the trackball mounting apparatus 100. The extension plate 102 can be pivoted to adjust the angle that is formed with the base plate 101 by means of a locking hinge mechanism 103. The locking hinge mechanism can comprise a plurality of hinge segments 107A–107E that are formed as part of base plate 101 and extension plate 102. A shaft 104 is inserted in well known fashion through the channels formed by the hinge segments 107A–107E and is secured in place by means of a lock mechanism, such as nut 105 applied to a threaded end of shaft 104. The user can activate this locking mechanism by tightening the nut 105 to prevent the rotation of extension plate 102 about the hinge mechanism 103 with respect to base plate 101. Alternatively, as shown in FIG. 6, the shaft 104 and nut 105 can be replaced by the use of a plurality of hinge lock features 108A–108B that mate with apertures formed in the associated ones of the hinge segments 107A–107C to implement the rotation capability. The friction between the mating hinge segments 107A–C and 107D–107E caused by the hinge lock features 108A–108B maintain the extension plate 102 in a selected position.

In operation, the user releases the locking mechanism, adjusts the angle of the extension plate 102 with respect to the base plate 101 and, once the desired angle is achieved, the user activates the locking mechanism to secure the base plate 101 and extension plate 102 in a fixed angular relationship. Typically, the range of motion of the extension plate 102 with respect to the base plate 101 is from 0° where the base plate 101 is coplanar with the extension plate 102 to 90° when the extension plate 102 is vertically oriented and perpendicular to the plane formed by the surface on which the keyboard 201 is placed. The base plate 101 and extension plate 102 are sized to be of sufficient extent to reliably perform their function. Typical dimensions for the extension plate 102 is 4 inches long and 8 inches wide, while the base plate 101 can typically be 6 inches long and 8 inches wide.

Figure 2:
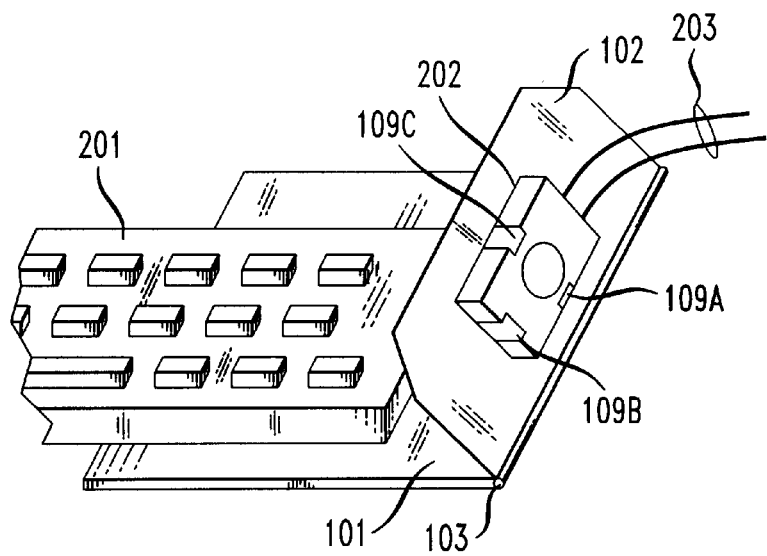
FIG. 2 illustrates the trackball mounting apparatus with a trackball mounted thereon in position on the right side of a personal computer keyboard.

As shown in FIG. 2, the data input device, such as a trackball 202 is mounted on the right most surface of the extension plate 102 when it is locked in its desired position and the trackball 202 can either be permanently mounted on the extension plate 102, or releasably attached by means of VELCRO® strips 106A, 106B mounted on the extension plate 102 and corresponding VELCRO® strips on the bottom of the trackball 202 (not shown) or a clamping mechanism 109A–109C (described below) that forms an aperture designed to receive the trackball 202 and maintain it securely in place on the surface of the extension plate 102. The trackball 202 is connected to the personal computer by means of an adapter cable 203 that enables the trackball 202 to be plugged into an appropriate and presently available input port that is part of the standard personal computer. One advantage of this arrangement is that the trackball 202 is mounted in close proximity to the keyboard 201 of the personal computer which prevents the user from having to reach a distance to operate the trackball apparatus 202. The trackball mounting apparatus 100 also conserves space on the surface on which the personal computer is placed, which a critical factor when only limited amount of space is available for this function, such as in an aircraft or on a desk. The trackball mounting apparatus 100 can accommodate a number of data input devices which include, but are not limited to: trackballs, pressure sensitive touch pads and joy sticks. By making the mounting apparatus 100 a hingeable device, this enables the user to orient the operating surface of the mounting apparatus 100 to any orientation that they feel convenient and comfortable to their particular needs. In addition, the hinge mechanism 103 can be designed to rotate between a 0° flat plane orientation to a 180° orientation where it folds back on itself to reduce the amount of space that it occupies when not in use.

As suggested above, one embodiment of the trackball receiving apparatus can consist of a mount that comprises three receiving brackets 109A–109C that are fixed in place on the extension plate 102 and of a size and location to form an aperture to receive the trackball 202 and that securely holds it in place without significant movement. The remaining side of the trackball mount can comprise a spring loaded tab (not shown) that responds to the user sliding the trackball 202 into position into the aperture formed by the three fixed brackets 109A–109C to deflect sufficiently to enable the trackball 202 to pass over this spring loaded tab apparatus which then springs back into place once the trackball 202 is securely positioned against the three fixed brackets 109A–109C to thereby maintain the trackball 202 in this location absent the user depressing the spring loaded mount to enable the trackball 202 to slide back out of its operating position where it is released from connection to the mounting apparatus 100. The trackball mounting apparatus 100 need not enable the removable connection of the trackball 202, but instead can be securely affixed to the trackball 202 to thereby relieve the user of the necessity of mounting the trackball 202 on this extension plate 102 each time the user wishes to use the trackball 202.

SUMMARY

Thus, the trackball mounting apparatus functions to mount a stationary pointing device in an orientation that is ergonomically correct for the user for use with a personal computer system to reduce the strain on the user's hand and arm muscles as well as to reduce the extent to which the data input device protrudes from the side of the personal computer.

What is claimed:

1. Apparatus for mounting a data input device for use with a personal computer, wherein said data input device is electrically connected to the personal computer by a cable that is pluggably insertable into an input device jack that is part of the personal computer, comprising:

base means for maintaining said apparatus in a predetermined position on a working surface on which said personal computer is placed;

data input device receiving means for receiving said data input device for retention in a secure manner; and means, connected to and interconnecting said base means and said data input device receiving means, for orienting said data input device in a user desired orientation, comprising:

extension plate attached to said data input device receiving means; and hinge means connected to said base means and said extension plate for enabling said extension plate to be rotated about said hinge means to form an angular relationship with said base means at an angle selected by a user.

2. The apparatus of claim 1 wherein said data input device receiving means comprises:

mount means having an aperture formed therein for releasably receiving said data input device.

3. The apparatus of claim 1 wherein said data input device receiving means comprises:

interlocking means for releasably mating with corresponding locking features on said data input device.

4. The apparatus of claim 1 wherein said base means comprises:

a plate having a length and a width of sufficient extent to be placed under a keyboard of said personal computer and maintain said apparatus in fixed relation thereto.

\* \* \* \* \*